United States Patent Office 3,723,095
Patented Mar. 27, 1973

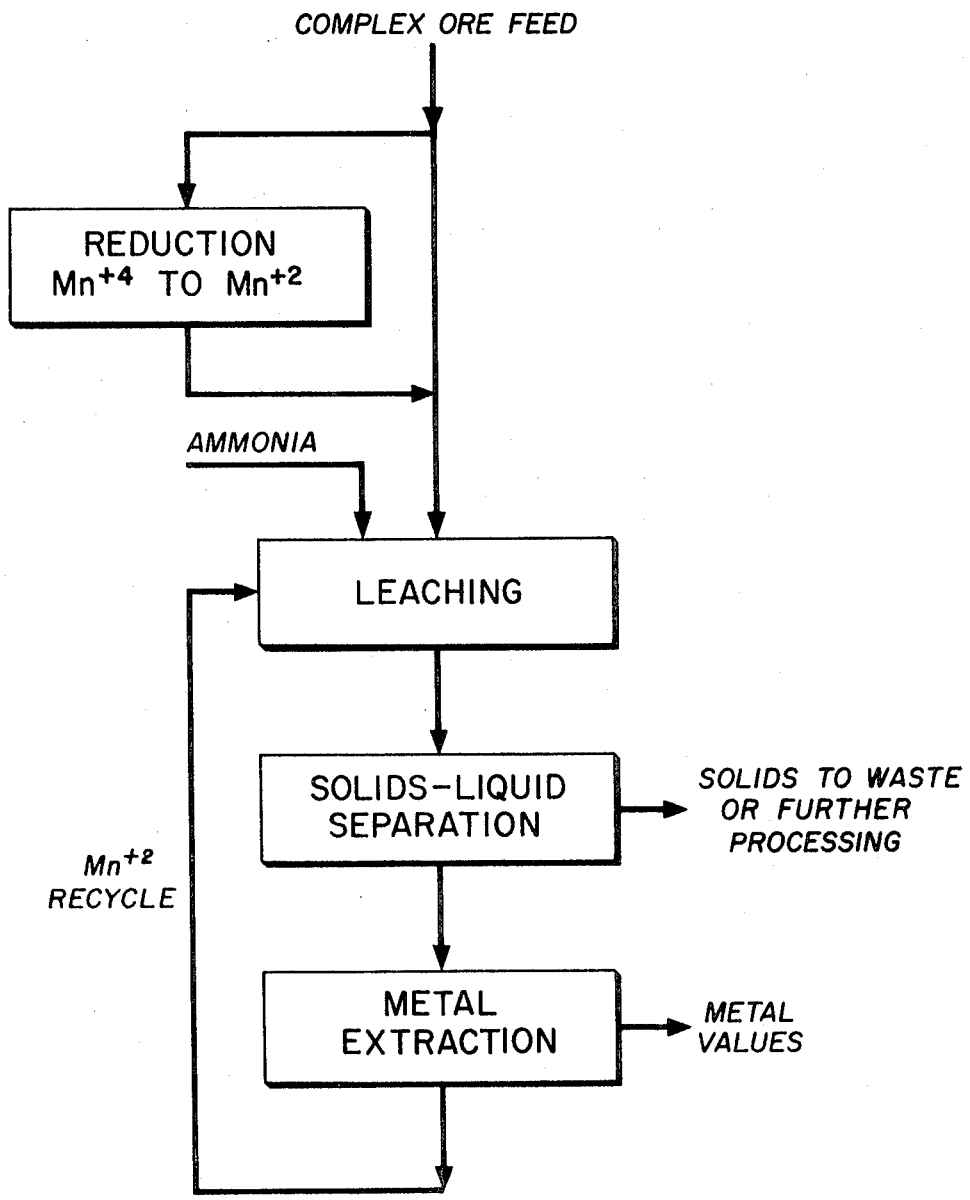

3,723,095
EXTRACTION OF COPPER AND NICKEL FROM MANGANESE NODULES
Roald R. Skarbo, Lexington, Mass., assignor to Kennecott Copper Corporation, New York, N.Y.
Filed July 16, 1970, Ser. No. 55,305
Int. Cl. C22b 3/00, 15/10
U.S. Cl. 75—21       13 Claims

ABSTRACT OF THE DISCLOSURE

Copper and nickel may be leached from complex ores containing manganese, iron, copper, nickel by leaching the complex ore with a solution containing manganous ions.

BACKGROUND OF THE INVENTION

With the quantity and quality of the world's reserves of copper, nickel, cobalt and molybdenum rapidly diminishing the metallurgical industry is continually looking for better ways of increasing the recovery from present mineral sources and is vigilant in attempting to develop economically attractive processes to recover metal values from ores believed to be of little economic value. Pelagic sedimentary materials containing significant quantities of metal values have been known since late in the nineteenth century however, no attempts have been made to recover the metal values therefrom. These pelagic sedimentary materials are considered to be complex ores which do not lend themselves to currently known extractive metallurgical processing techniques. Up to the present time these complex ores have only been found on the deep-sea floor of the oceans and lakes. Terrestrial ore beds containing manganese, iron, copper, nickel, molybdenum, cobalt and other metal values where the ore has physical characterization similar to ocean floor ores have not as yet been discovered. However it is not unlikely that the same or similar type of complex ores will be located as terrestrial deposits. For the purpose of the remainder of this patent specification these complex ores will be variously referred to as deep sea nodules, deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The nodules invariably show an onionskin or concentric layer structure and are frequently oolitic within individual layers. However the nodules have no overall crystalline structure. The literature tells us that the nodules consist of a number of intimately and randomly intergrown crystallites of many minerals among which are barite, rutile, anatase, goethite, and several apparently new minerals of manganese. Attempts have been made to characterize these new manganese minerals by X-ray diffraction, electron diffraction and electron probe investigation without much success. Copper and nickel ore are not present in the nodule in the usual form found in terrestrial ores. It has been postulated that copper and nickel are present in the nodule as a result of a substitution mechanism. It has not been possible, therefore, to determine the best method of extracting the mineral values from the deep sea manganese nodules, particularly copper, nickel, cobalt and molybdenum.

The character and chemical content of the deep sea nodules may vary widely depending upon the region from which the nodules are obtained. For a detailed chemical analysis of nodules from the Pacific Ocean, see pages 449 and 450 in The Encyclopedia of Oceanography, edited by R. W. Fairbridge, Reinhold Publishing Corp., N.Y., 1966, and U.S. Pat. No. 3,169,856. For the purpose of this invention the complex ores will be considered as containing the following metal content range on a dry basis.

Metal Content Analysis Range

|             | Percent    |
|-------------|------------|
| Copper      | 0.8–1.8    |
| Nickel      | 1.0–2.0    |
| Cobalt      | 0.1–0.5    |
| Molybdenum  | 0.03–0.1   |
| Manganese   | 10.0–40.0  |
| Iron        | 4.0–25.0   |

The remainder of the ore consists of clay minerals with lesser amounts of quartz, apatite, biotite and sodium and potassium feldspars. Of the many ingredients making up the manganese nodules, copper and nickel are emphasized because, from an economic standpoint, they are the most significant metals in most of the ocean floor ores. Cobalt and molybdenum may also be recovered by the process of this invention.

The mining of the vast reserves of manganese deep sea nodules lying over the ocean floor, can best be economically justified, were a more economical process available to effect separation and ultimate recovery of the copper and nickel elements. The recovery of molybdenum and cobalt from these complex ore is also of economic interest.

Accordingly, among the objects of this invention are to provide a novel and improved process for extracting valuable metal values from the complex ores or manganese deep sea nodules. Another object is to provide a novel and improved process for extracting copper and nickel as found in manganese deep sea nodules, which process, at the same time facilitates the recovery of the cobalt and molybdenum elements contained in the nodules.

SUMMARY

This invention relates to a process for selectively recovering copper and nickel from complex ores containing manganese, iron, copper, nickel, cobalt and molybdenum.

It has been discovered that copper and nickel are selectively removed from complex ores containing iron, manganese, copper and nickel by leaching the ore with an aqueous solution containing the manganous ion ($Mn^{++}$). Substantially all of the copper and nickel are thereby solubilized and pass into the aqueous leach phase. The copper and nickel may then be recovered from the aqueous leach liquor by any desirable method.

DESCRIPTION OF PREFERRED EMBODIMENTS

Example I

A twenty gram sample of deep sea manganese nodules assaying about 1.0 weight percent copper and 1.2 weight percent nickel was leached with 200 ml. of leach solution containing 100 g. $NH_3$/l. and 1 M $Mn^{++}$ in the form of $MnSO_4 \cdot H_2O$. The reaction mixture was maintained at about 60° C. for four hours under a nitrogen atmosphere. The suspension was then filtered and the residue dried in air at room temperature. The residue weight was 31.6 grams. X-ray analysis of the leach residue showed that the manganese phase was $MnO(OH)$. Thus the tertavalent manganese ($Mn^{+4}$) present in the deep sea nodules was reduced in the presence of manganous ion ($Mn^{+2}$) to trivalent manganese ($Mn^{+3}$).

Chemical analysis of the leach solution and residue revealed that 87% of the copper and 88% of the nickel was solubilized and removed from the manganese nodule.

Example I indicates that tetravalent manganese is reduced to trivalent manganese in the presence of manganous ions. It is clear that recovery of copper and nickel from complex ores can be accoomplished by providing a source of Mn++ ions in solution.

Innumerable sources of manganous ions exist. For purposes of illustration several sources of manganous ions will be mentioned. Any manganous compound soluble in the leach solution can be used as the source of manganous ions. The following exemplify such manganous compounds: manganous oxide, manganous carbonate, manganous ammonium sulfate, manganous chloride, and manganous sulfate. The preferred chemical compounds as sources of manganous ions are manganous chloride and manganous sulfate.

It is desirable that the manganous ion content of the leach solution be from about 0.25 to about 2.0 molar. The preferred manganous ion content is 1 molar. The ammonia content of the leach solution may be from about 5 percent to about 25 percent by weight. Ten percent ammonia is preferred.

The complex ore or the deep sea nodules themselves may be used as a source of manganous ions. The nodules may be reduced by mixing with a carbon containing material and heated as described in co-pending patent application of T. C. Wilder, and J. J. Andreola Ser. No. 55,608, filed on July 16, 1970 and assigned to the same assignee. The manganese nodules may also be reduced by reaction with a reducing gas as described in co-pending patent application of M. J. Redman, Ser. No. 55,304, filed on July 16, 1970 and assigned to the same assignee.

The drawing shows a representative flow sheet for a hydrometallurgical process that may be used to extract metal values in accordance with the invention herein. In the preferred process the complex ore or deep sea manganese nodules are ground and a portion of them are fed to a reduction step. In the reduction step the tetravalent manganese in the ore is reduced to the divalent state. The reduction may be accomplished in any convenient way. The aforementioned co-pending patent applications more specifically describe methods of reducing the valence of manganese in the complex ores. These are reducing with a carbon containing material, and gaseous reduction. The reduction processes result in the reduction of the tetravalent manganese to the divalent state. However for the purposes of this invention any means of providing manganous ions in solution may be used.

The feed stream of the complex ore or nodules is preferably divided so that at least one half and preferably about two thirds of the ore is fed to the reduction step. After the reduction step the reduced nodules or reduced complex ore is recombined as shown in the flow diagram with unreduced nodules or complex ore. The mixture of the unreduced and reduced complex ore is then fed to a leaching step. In the leaching step the mixture of ores are contacted with an ammoniacal leach solution. After sufficient contact time the leach solution slurry is fed to a solid-liquid separation step. The separation may be done in any convenient manner such as filtration or decantation. The solids are removed and further processed to recover other metal values therein or merely discarded.

The metal value rich leach solution containing copper, nickel, cobalt and molybdenum are then treated to extract the metal values therefrom. These metal values may be recovered by, for example, precipitation, electrowinning, membrane filtration techniques, etc. After recovery of the metal values the remaining solution containing a significant quantity of manganous ions is recycled to the leaching step. Make up components are also added to the leaching step as required.

In the process discussed above if it is not convenient to provide reduction of a portion of the complex ore or manganese nodules, manganous ions from other sources may be added to the complex ore or feed stream. Examples of manganous compounds that may provide manganous ions are recited above.

Although it is not entirely clear why the mixing of unreduced manganese nodules with reduced manganese nodules followed by an ammoniacal leach renders the copper, nickel, cobalt and molybdenum soluble the following may in part explain the process. During reduction as for example by means of carbon the valence state of the manganese in the deep sea nodules apparently changes from tetravalent to divalent. When the reduced nodules are mixed with unreduced nodules and leached in an aqueous ammoniacal solution the manganese in the divalent state apparently dissolves and reduces the manganese in the tetravalent state to manganese in the trivalent state according to the reaction.

$$Mn^{++} + MO_2(s) + 2(OH)^- \rightarrow 2MnO(OH)(s)$$

The explanation of why the copper, nickel, cobalt and molybdenum in the manganese nodule is rendered leachable in the presence of this apparent reaction is not known. However it is theorized that the valuable mineral constituents are held in the complex ore by some substitution mechanism. By changing the character of the manganese compound into which the valuable mineral constituents are complexed it is believed that such complex is broken down and the valuable mineral constituents are released in soluble form.

EXAMPLE II

Manganese deep sea nodules were dried, ground and leached for about 4 hours at 60° C. in an inert atmosphere with aqueous solutions containing about 10% ammonia/ and about 1 molar manganese in the divalent state. The following extractions were obtained

| Solution | Extraction, weight percent | |
|---|---|---|
| | Cu | Ni |
| 10% NH₃/1 M MnCl₂ | 86.7 | 85.5 |
| 10% NH₃/1 M MnSO₄ | 87.9 | 87.5 |

X-ray diffraction analysis of the leach residue confirmed that the manganese phase of the original nodule sample was converted into an insoluble oxide of $Mn^{+3}$.

EXAMPLE III

Two five gram samples of dried manganese nodules, assaying about 1.4% Cu, 1.5% Ni, 0.15% Co and 0.06% Mo, were added to separate reaction flasks containing 200 ml. leach solution of 100 g. NH₃/l. and 1 M (NH₄)₂SO₄. In addition, one of the leach solutions contained 0.5 M $Mn^{+2}$ added in the form of MnSO₄·H₂O. The reaction mixtures were heated to 60° C. and maintained at that temperature for four hours under an atmosphere of nitrogen. The suspensions were then filtered and the residues dried in air at room temperature. Based on chemical analysis of the leach solutions and residues, the following extractions were calculated:

| Leach solution | Extractions, percent | | | |
|---|---|---|---|---|
| | Cu | Ni | Co | Mo |
| 100 g. NH₃/l, 1 M (NH₄)₂SO₄ | 22 | 4 | 4 | 34 |
| 100 g. NH₃/l, 1 M (NH₄)₂SO₄, 0.5 M Mn++ | 89 | 88 | 92 | 25 |

Example III shows that minor extractions of the valuable metals can be achieved with an ammonia/ammonium sulfate leach solution. However, with the addition of manganous ion ($Mn^{+2}$) to the leach solution substantially all the copper, nickel and cobalt are extracted from the deep sea nodules.

EXAMPLE IV

Six leach solutions of the following composition were prepared:

(a) 100 g. $NH_3$/liter
(b) 100 g. $NH_3$/liter, 0.5 molar $MnSO_4 \cdot H_2O$
(c) 100 g. $NH_3$/liter, 1 molar $(NH_4)_2SO_4$, 0.5 molar $MnSO_4 \cdot H_2O$
(d) 200 g. $NH_3$/liter, 1 molar $(NH_4)_2SO_4$, 0.5 molar $MnSO_4 \cdot H_2O$
(e) 1 molar $(NH_4)_2SO_4$, 0.5 molar $MnSO_4 \cdot H_2O$
(f) 0.5 molar $MnSO_4 \cdot H_2O$ Five grams of deep sea manganese nodules were added to 200 ml. of each of the six leach solutions. The manganese nodules and leach solutions were than heated to about 60° C. and maintained at that temperature for one hour under a nitrogen atmosphere. The suspensions were subsequently filtered and the leach residues dried at 100° C. Chemical analysis of the leach solution and residues were used to calculate the percentage of copper and nickel extracted for each case. The results obtained were as follows:

| Composition of each solution | | | Extractions, nearest percent | |
|---|---|---|---|---|
| $NH_3$, grams/liter | $(NH_4)_2SO_4$, molar | $MnSO_4 \cdot H_2O$, molar | Copper | Nickel |
| 100 | Nil | Nil | <1 | <1 |
| 100 | Nil | 0.5 | 66 | 66 |
| 100 | 1.0 | 0.5 | 68 | 63 |
| 200 | 1.0 | 0.5 | 55 | 49 |
| Nil | 1.0 | 0.5 | 64 | 61 |
| Nil | Nil | 0.5 | 3 | 3 |

Example IV shows that ammonia alone and manganous ion alone in solution under the conditions of this example do not extract copper and nickel from deep sea manganese nodules. Solutions containing the manganous ion and the ammonium ion will extract significant quantities of copper and nickel from deep sea manganese nodules.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

What I claim is:

1. The method of extracting copper, nickel, cobalt and molybdenum from deep sea manganese nodules wherein iron, copper, nickel, cobalt and molybdenum is present in the deep sea nodules as oxides or mixed oxides and said manganese is present as manganese dioxide comprising the steps of
   (a) preparing a leach solution containing ammonia, water and manganous ions by dissolving a soluble manganous salt in an aqueous ammonia solution,
   (b) leaching the deep sea manganese nodules with the aqueous ammonia solution containing manganous ions for a period of time sufficient to solubilize substantially all of the copper, nickel, cobalt and molybdenum whereby the copper, nickel, cobalt and molybdenum is selectively liberated from the deep sea manganese nodules while substantially all of the iron and manganese remain in a nodule residue and
   (c) separating a copper, nickel, cobalt and molybdenum rich leach solution from the residue of the deep sea manganese nodules.

2. The process of claim 1 wherein the nodules are leached in a 10% ammonia solution at a temperature of about 60° C.

3. The process of claim 3 wherein the manganous ion content is from about 0.25 to about 2.0 molar.

4. The method of extracting copper and nickel from deep sea nodules wherein iron, copper and nickel is present in the deep sea nodules as oxides or mixed oxides and said manganese is present as manganese dioxide comprising the steps of
   (a) preparing an aqueous leach solution containing from about 5 to about 25 percent by weight ammonia and a manganous ion content of from about 0.25 to about 2.0 molar,
   (b) leaching the deep sea nodules with the aqueous leach solution whereby copper and nickel is selectively extracted from the deep sea nodules while substantially all the iron and manganese report to a deep sea nodule residue,
   (c) separating the aqueous leach solution containing the copper and nickel from the deep sea nodule residue and
   (d) recovering the copper and nickel from the aqueous leach solution.

5. The method of recovering copper, nickel, cobalt and molybdenum from deep sea manganese nodules wherein iron, copper, nickel, cobalt and molybdenum is present in the deep sea nodules as oxides or mixed oxides and said manganese is present as manganese dioxide comprising the steps of
   (a) preparing a leach solution containing ammonia, water and manganous ions by dissolving a soluble manganous salt in an aqueous ammonia solution,
   (b) leaching the deep sea manganese nodules with the aqueous ammonia solution containing the manganous ions for a period of time sufficient to solubilize substantially all of the copper, nickel, cobalt and molybdenum in the deep sea manganese nodules and convert the soluble manganous ions in the leach solution to an insoluble form
   (c) separating a copper, nickel, cobalt and molybdenum rich leach solution from a residue of the deep sea manganese nodules, the rich leach solution being substantially free from manganese and iron and
   (d) recovering metal values of copper, nickel, cobalt and molybdenum from the rich leach solution.

6. The process of claim 5 wherein the nodules are leached in a 10% ammonia solution at a temperature of about 60° C.

7. The process of claim 6 wherein the manganous ion content is from about 0.25 to about 2.0 molar.

8. The method of recovering copper, nickel, cobalt and molybdenum from deep sea manganese nodules wherein iron, copper, nickel, cobalt and molybdenum is present in the deep sea nodules as oxides or mixed oxides and said manganese is present as manganese dioxide comprising the steps of
   (a) providing a feed stream of deep sea manganese nodules,
   (b) reducing a first portion of the feed stream of deep sea manganese nodules such that the manganese is in the manganous form and leaving a second portion of the feed stream of deep sea manganese nodules in the unreduced state,
   (c) mixing the reduced first portion of deep sea manganese nodules with the unreduced second portion of deep sea manganese nodules,
   (d) leaching the mixed first and second portions of deep sea manganese nodules with an aqueous ammonia solution for a period of time sufficient to convert the soluble manganese to the insoluble form whereby copper, nickel, cobalt and molybdenum in the deep sea manganese nodules are selectively solubilized,
   (e) separating a copper, nickel, cobalt and molybdenum rich leach solution from a residue of the deep sea manganese nodules, the rich leach solution being substantially free from manganese and iron, and (f) recovering copper, nickel, cobalt and molybdenum from the rich leach solution.

9. The process of claim 8 wherein the portion of the feed stream reduced is accomplished by mixing the portion of the feed stream to be reduced with a carbonaceous material and heating.

10. The process of claim 8 wherein the portion of the feed stream to be reduced is reduced by contacting the deep sea manganese nodules with a gaseous reducing agent selected from synthesis gas, mixtures of carbon dioxide and carbon monoxide and mixtures of carbon monoxide and hydrogen.

11. The process of claim 8 wherein from about one-half to two-thirds of the feed stream is reduced.

12. The process of claim 3 wherein the soluble manganous salt is selected from the group consisting of manganous chloride, manganous sulfate, manganous carbonate, manganous oxide and manganous ammonium sulfate.

13. The process of claim 5 wherein a soluble manganous salt selected from the group consisting of manganous chloride, manganous sulfate, manganous chloride, manganous carbonate, manganous oxide and manganous ammonium sulfate is solubilized in aqueous ammonia in preparing the aqueous leach solution.

References Cited

UNITED STATES PATENTS

| | | | |
|---|---|---|---|
| 2,074,013 | 3/1937 | Bradley | 75—103 |
| 3,471,285 | 10/1969 | Rolf | 75—103 |
| 3,450,523 | 6/1969 | Socolescu | 75—7 |
| 3,169,856 | 2/1965 | Mero | 75—117 |
| 2,822,261 | 2/1958 | Mackiw | 75—103 |
| 2,363,315 | 11/1944 | Grothe | 75—103 |
| 2,608,463 | 8/1952 | Dean | 75—103 |
| 2,663,618 | 12/1953 | Babbitt | 75—103 |
| 2,647,828 | 8/1953 | McGauley | 75—103 |

WINSTON A. DOUGLAS, Primary Examiner

P. D. ROSENBERG, Assistant Examiner

U.S. Cl. X.R.

75—103, 117, 119